United States Patent
Amin et al.

(10) Patent No.: US 11,598,839 B2
(45) Date of Patent: Mar. 7, 2023

(54) METHODS FOR OBTAINING A LOCATION USING NEIGHBOR AWARENESS NETWORKING, NAN, AS WELL AS A CORRESPONDING SYSTEM AND NAN DEVICE

(71) Applicant: Telefonaktiebolaget LM Ericsson (publ), Stockholm (SE)

(72) Inventors: Parth Amin, Espoo (FI); Meng Wang, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 36 days.

(21) Appl. No.: 17/230,663

(22) Filed: Apr. 14, 2021

(65) Prior Publication Data

US 2021/0231768 A1 Jul. 29, 2021

Related U.S. Application Data

(63) Continuation of application No. 16/306,400, filed as application No. PCT/EP2016/063007 on Jun. 8, 2016, now Pat. No. 10,989,789.

(51) Int. Cl.
*G01S 5/14* (2006.01)
*G01S 5/02* (2010.01)
(Continued)

(52) U.S. Cl.
CPC ............... *G01S 5/14* (2013.01); *G01S 5/019* (2020.05); *G01S 5/02213* (2020.05); *H04W 84/12* (2013.01)

(58) Field of Classification Search
CPC ....... G01S 5/14; G01S 5/0221; G01S 5/02213
(Continued)

(56) References Cited

U.S. PATENT DOCUMENTS

2008/0125161 A1  5/2008  Ergen et al.
2014/0180581 A1* 6/2014  Berlin .................. G01S 5/10
                                                    235/375
(Continued)

FOREIGN PATENT DOCUMENTS

CN  101137913 A  *  3/2008  ............. G01S 5/14
CN  101495885 A  *  7/2009  ............. G01S 11/06
(Continued)

OTHER PUBLICATIONS

Unknown, Author, "Discover Wi-Fi", Wi-Fi Alliance, https://www.wi-fi.org/discover-wi-fi/wi-fi-aware, pp. 1-5.
(Continued)

*Primary Examiner* — Harry K Liu
(74) *Attorney, Agent, or Firm* — Murphy, Bilak & Homiller, PLLC

(57) ABSTRACT

The present invention relates to a method for obtaining a location using Neighbor Awareness Networking, NAN, and a corresponding system as well as a method carried out by a NAN device and a corresponding NAN device so that a location can be obtained in a simple way. In particular, the method for obtaining a location using neighbor awareness networking, NAN, comprises requesting the location of a target NAN device; determining a cluster of wireless NAN devices comprising the target NAN device as well as one or more anchor NAN devices having predetermined locations to serve as positioning nodes; performing range measurements using the travel times of radio signals between the target NAN device and each of the one or more anchor NAN devices; and obtaining the location of the target NAN device based on the range measurements.

11 Claims, 12 Drawing Sheets

(51) Int. Cl.
*G01S 5/00* (2006.01)
*H04W 84/12* (2009.01)

(58) Field of Classification Search
USPC .......................................... 342/451
See application file for complete search history.

(56) References Cited

U.S. PATENT DOCUMENTS

| | | |
|---|---|---|
| 2014/0211779 A1 | 7/2014 | Caire et al. |
| 2016/0014565 A1 | 1/2016 | Segev et al. |
| 2016/0088497 A1 | 3/2016 | Segev et al. |
| 2018/0172812 A1 | 6/2018 | Kneckt et al. |
| 2022/0187413 A1* | 6/2022 | Hammes .................. G01S 3/46 |

FOREIGN PATENT DOCUMENTS

| | | | |
|---|---|---|---|
| CN | 105491527 A * | 4/2016 | |
| WO | WO-2014027942 A1 * | 2/2014 | ............. G01S 5/021 |

OTHER PUBLICATIONS

Unknown, Author, "Neighbor Awareness Networking Technical Specification—Version 1.0", Wi-Fi Alliance, May 2015, pp. 1-98.
Unknown, Author, "Wi-Fi Neighbor Awareness Networking (NAN) 9 Technical Specification", Wi-Fi Alliance, Version 1.0 r20, https://www.wi-fi.org/wi-fi-nan-technical-specification-v10, pp. 1-231.

* cited by examiner

METHODS FOR OBTAINING A LOCATION USING NEIGHBOR AWARENESS NETWORKING, NAN, AS WELL AS A CORRESPONDING SYSTEM AND NAN DEVICE

TECHNICAL FIELD

The present invention relates to a method for obtaining a location using Neighbor Awareness Networking, NAN, and a corresponding system as well as a method carried out by a NAN device and a corresponding NAN device. In particular, the methods, system and NAN device allow for obtaining the location of a NAN device in a cluster of NAN devices.

BACKGROUND

With connected social, local and mobile applications growing at a high pace, a new capability has been introduced to make it easier for users to discover nearby devices, applications, and information. The use of radio technologies, such as IEEE 802.11 and 3GPP LTE, provides a distribution medium between devices in a neighborhood. This sort of wireless connectivity may be provided over so-called social channels. For instance, the Wi-Fi Alliance has been working on Wi-Fi Direct and Neighbor Awareness Networking (NAN). In such a setting, devices may scan the social channels to discover other user devices or wireless access points (APs). NAN (aka Wi-Fi Aware) enables power efficient discovery of nearby information (devices, people, access points) and services, by means of device-to-device communication.

For example, NAN devices may perform a discovery function before connecting, further improving the wireless convenience for social applications, such as gaming, peer-to-peer messaging, and media sharing, as well as geographic-specific services, such as proximity assessment, contextual notifications, service offers and others. NAN makes it easy to find services available in the area that match preferences set by the user—and is optimized to work well even in crowded environments. The user may launch an application, which will connect wirelessly to the service or the application may start without user interaction.

Different chipsets support Wi-Fi Aware, whereas further details about the program can be found at http://www.wi-fi.org/discover-wi-fi/wi-fi-aware and https://www.wi-fi.org/wi-fi-nan-technical-specification-v10 (Sections 1 and 2 cover Introduction and Architecture of NAN). A NAN device may be defined as a mobile handset/laptop or any other communication device certified by Wi-Fi Alliance's Wi-Fi Aware program, wherein communication between NAN devices is based on IEEE 802.11n (or higher) physical layer which operates at 2.4 GHz and 5 GHz carrier frequencies. The NAN specification defines new MAC mechanisms to support cluster formation, master selection within a cluster, cluster discovery and acquiring synchronization within a cluster, cluster selection and merging, NAN service discovery protocol, etc. A cluster of NAN devices, herein also referred as NAN stations (NAN STA), is illustrated in FIG. 1. In this example, there are four NAN devices 110 to 140 and a NAN master device managing the cluster. The arrows show possibly wireless communication connections.

The NAN protocol supports the formation of the cluster and maintaining time synchronization within the cluster based on transmissions of NAN synchronization beacons. The NAN master device (NAN STA Master in FIG. 1) transmits NAN discovery beacons to announce the existence of the cluster to the neighbors, who are not part of the NAN cluster. A NAN device transmits NAN service discovery frames to either publish or subscribe to services within a cluster.

For example, as illustrated in FIG. 2, NAN discovery beacons are shown which may be used by NAN devices to discover a cluster. The NAN devices of a cluster may transmit NAN sync beacons for clock synchronization within a discovery window (DW) from a first time DWStart to a second time DWEnd. In the same DW the NAN devices may transmit NAN service discovery frames to publish or subscribe to services within the cluster, e.g. one NAN device may publish a service and another one may subscribe to it. Similar signaling may occur in another DW, as shown on the right side of FIG. 2, in which the same or other NAN devices may form a cluster.

Network Awareness Networking thus allows wireless handheld devices based on Wi-Fi technology, such as IEEE 802.11n, to continuously discover other services and NAN devices while operating in the background in an energy-efficient way.

SUMMARY

Although work towards providing indoor positioning solutions to accurately position devices indoors is currently carried out using different technologies, simple, accurate and reliable positioning, i.e. location finding, is lacking. In particular, indoors, where Global Positioning System (GPS) does not work, obtaining an accurate location of a wireless and possibly constantly moving device is desired to provide proximity services based on the user preferences, for example.

The NAN specification of the Wi-Fi Alliance "Neighbor Awareness Networking Technical Specification" Version 1.0 of 2015 already includes functionality to allow Received Signal Strength Indication (RSSI) based ranging for services that require ranging. However, the RSSI based ranging may not be sufficiently reliable for applications where accurate ranging is required. Better ranging techniques need to be incorporated.

In addition, for a typical WiFi network, the involved nodes can be a mixture of NAN devices of different, e.g. earlier and future, releases as well as one or more access points (APs), such as wireless access routers. Those nodes/devices may vary significantly in terms of computational capability for positioning purpose. Therefore, there is also a need for a suitable node/device as location center performing computational tasks, in particular for scenarios with a lack of AP nodes.

It is thus desirable to provide methods, systems, NAN devices and computer programs to enable simple, accurate and/or reliable location information provisioning.

Suitable methods, a system, a NAN device and a computer program are defined in the independent claims. Advantageous embodiments are defined in the dependent claims.

In one embodiment, a method for obtaining a location using Neighbor Awareness Networking, NAN, comprises or initiates requesting the location of a target NAN device. Further, the method, e.g. carried out by a system of wireless nodes, comprises or initiates the determination of a cluster of wireless NAN devices comprising the target NAN device as well as one or more anchor NAN devices, wherein an anchor NAN device may be defined as a NAN device with a predetermined, i.e. previously determined and thus known, location so as to serve as positioning node in the location obtaining method. Further, the method comprises or initiates performing range measurements using the travel times of radio signals between the target NAN device and each of the one or more anchor NAN devices. Once range measurements are performed, the location of the target NAN device may be obtained based on these range measurements. Accordingly, a NAN device location can be obtained accurately with a simple method.

In one embodiment, a method carried out by a NAN device for obtaining a location using Neighbor Awareness Networking, NAN, is discussed, which comprises or initiates the following steps. The NAN device determines a cluster of wireless NAN devices comprising a target NAN device and the NAN device itself having a predetermined location to serve as positioning node. Further, range measurements using the travel times of radio signals between the target NAN device and the NAN device are obtained and other range measurements from the travel times of radio signals between the target NAN device and each of one or more other NAN devices are received. Based on the received range measurements the location of the target NAN device can be computed. Accordingly, a NAN device location can be obtained accurately with a simple method.

In one embodiment, a NAN device is provided which has a predetermined location to serve as a positioning node in a cluster of NAN devices. The NAN device comprises a determiner configured to determine a cluster of wireless NAN devices comprising a target NAN device and at least the NAN device as well as a time measuring unit configured to obtain range measurements using the travel times of radio signals between the target NAN device and the NAN device. Further, the NAN device comprises a receiver configured to receive range measurements from travel times of radio signals between the target NAN device and each of one or more other NAN devices. A processor of the NAN device is configured to compute the location of the target NAN device based on the range measurements. Accordingly, a NAN device location can be accurately obtained.

In one embodiment, a system for obtaining a location using Neighbor Awareness Networking, NAN, comprises a requestor configured to request the location of a target NAN device. The system further comprises a determiner configured to determine a cluster of wireless NAN devices comprising the target NAN device as well as one or more anchor NAN devices having predetermined locations to serve as positioning nodes. Additionally, a time measuring unit is provisioned and configured to obtain range measurements using the travel times of radio signals between the target NAN device and each of the anchor NAN devices. A processor of the system is configured to compute the location of the target NAN device based on the range measurements. Accordingly, a NAN device location can be accurately obtained.

In another embodiment, a computer program is provided which includes instructions configured, when executed on a processor, to cause the processor to carry out or to initiate the above-described methods.

Further, advantageous embodiments of the invention are disclosed in the dependent claims.

DESCRIPTION OF THE EMBODIMENTS

Further embodiments of the invention are described with reference to the figures. It is noted that the following description contains examples only and should not be construed as limiting the invention.

In the following, similar or same reference signs indicate similar or same elements or operations.

Figure 1:
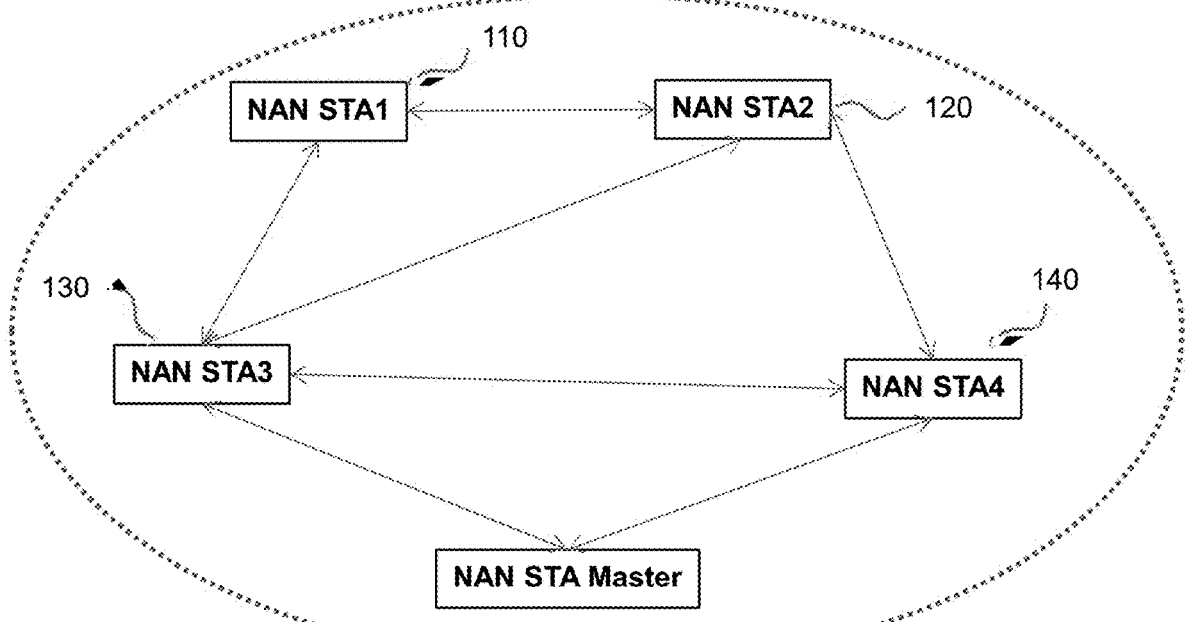
FIG. 1 illustrates a schematic of a NAN cluster managed by a NAN master device.
Figure 2:
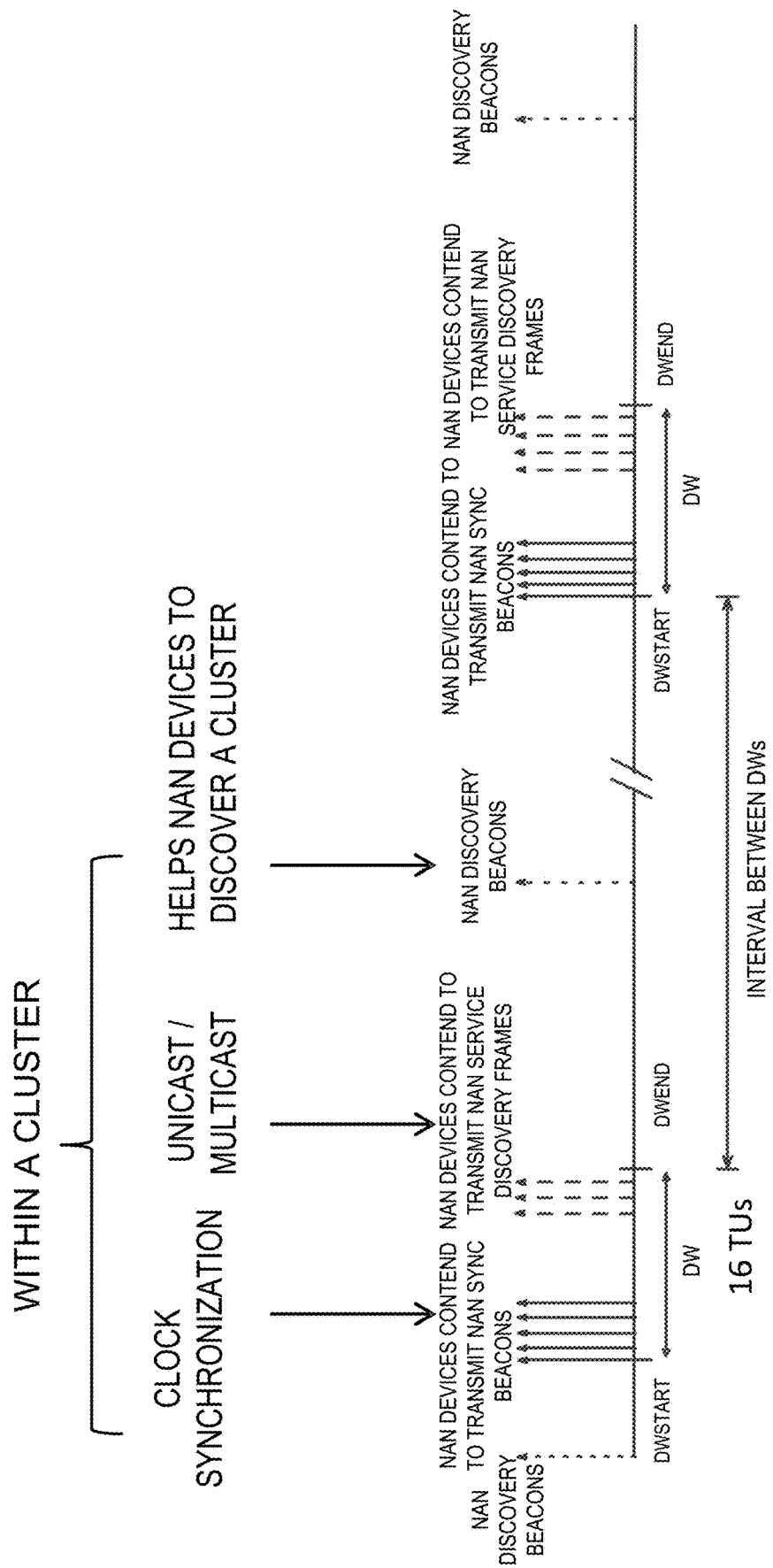
FIG. 2 illustrates different operations of NAN devices, such as transmitting beacons to announce the existence of clusters, announcing the synchronization timing and service discovery.
Figure 3:
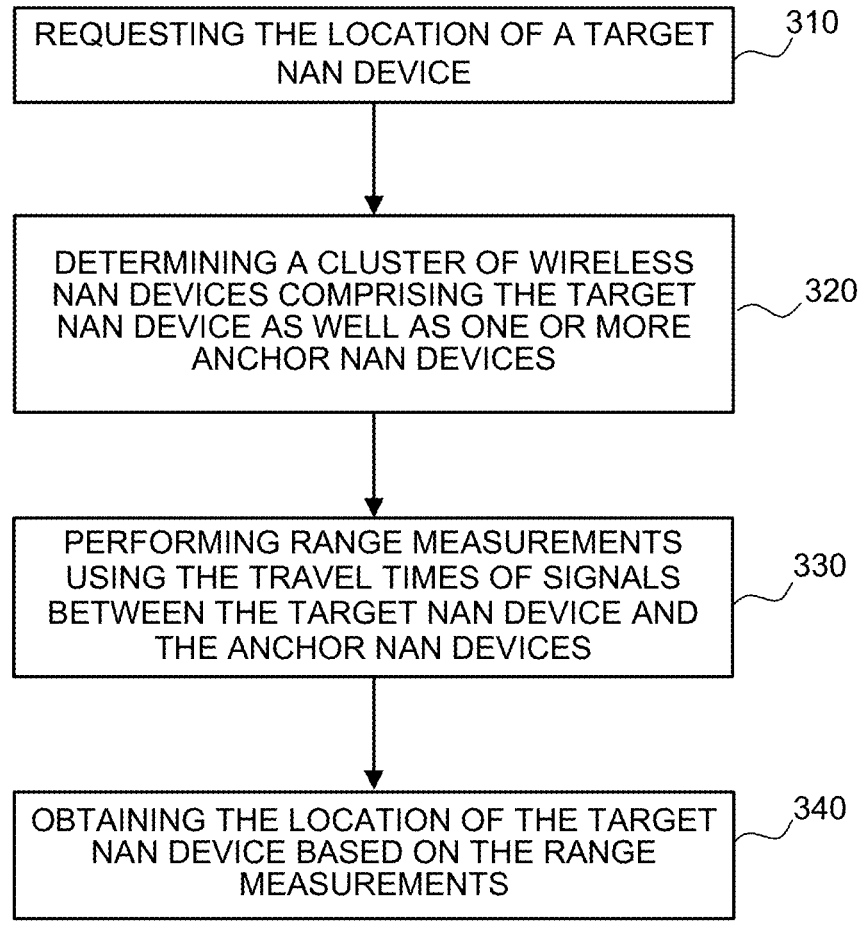
FIG. 3 illustrates operations of a method for obtaining a location of a NAN device according to an embodiment.

FIG. 3 illustrates a flowchart of a method for obtaining a location using Neighbor Awareness Networking in a wireless communication system. The operations, also referred to as steps in the following, of the method may be carried out or initiated by one node or different nodes of the system, e.g. one or more NAN devices and/or one or more access points (APs). For example, the functions described in FIG. 3 can also constitute functional elements in one or more nodes of the system. One exemplary node is the NAN device which will be discussed with respect to FIG. 10 later.

As discussed above, a NAN device may be defined as a mobile handset or laptop or other communication device working in accordance with the above-mentioned Neighbor Awareness Networking Technical Specification by the Wi-Fi Alliance, wherein a communication between NAN devices is based on IEEE 802.11n (or higher) physical layer which operates at 2.4 GHz and 5 GHz carrier frequencies.

In FIG. 3, the method comprises or initiates four steps. In a first step 310, the location of a target NAN device is requested. The request may be issued by the target NAN device itself or another NAN device, preferably belonging to the same cluster, or by a NAN service, e.g. running on a server, requiring the device location to offer a service to the target NAN device. Examples are provided further below.

In step 320, a cluster of wireless NAN devices comprising the target NAN device as well as one or more (preferably two or three) anchor NAN devices is determined. For example, a target NAN device is a NAN device of a cluster, such as NAN cluster 410 of FIG. 4A, 4B or 4C, which has an unknown location, i.e. the position/location coordinates are not known, because this device may have recently moved or its location was never known or determined before. An anchor NAN device, on the other hand, may be a NAN device with a predetermined, i.e. previously determined and thus now known, location and may thus serve as positioning node in the location obtaining method of FIG. 3. The known location coordinates may be stored in the node or/and in a neighboring node or server.

For example, a positioning node is a node which is able to assist in obtaining the location of a target NAN device, since its location is known and it is able to communicate its location and results of range measurements to other nodes. The determination of a cluster may include searching for other NAN devices by an anchor or target NAN device. For example, a NAN discovery beacon is transmitted and in response a NAN service discovery frame is received. In one embodiment, the target NAN device exchanges information with neighboring NAN devices for checking their availability as positioning node. Several NAN devices in the cluster may serve as positioning nodes. Different positioning nodes may be differently reliable. For example, a laptop is usually more or less stationary and thus is more reliable for positioning.

Figure 4A:
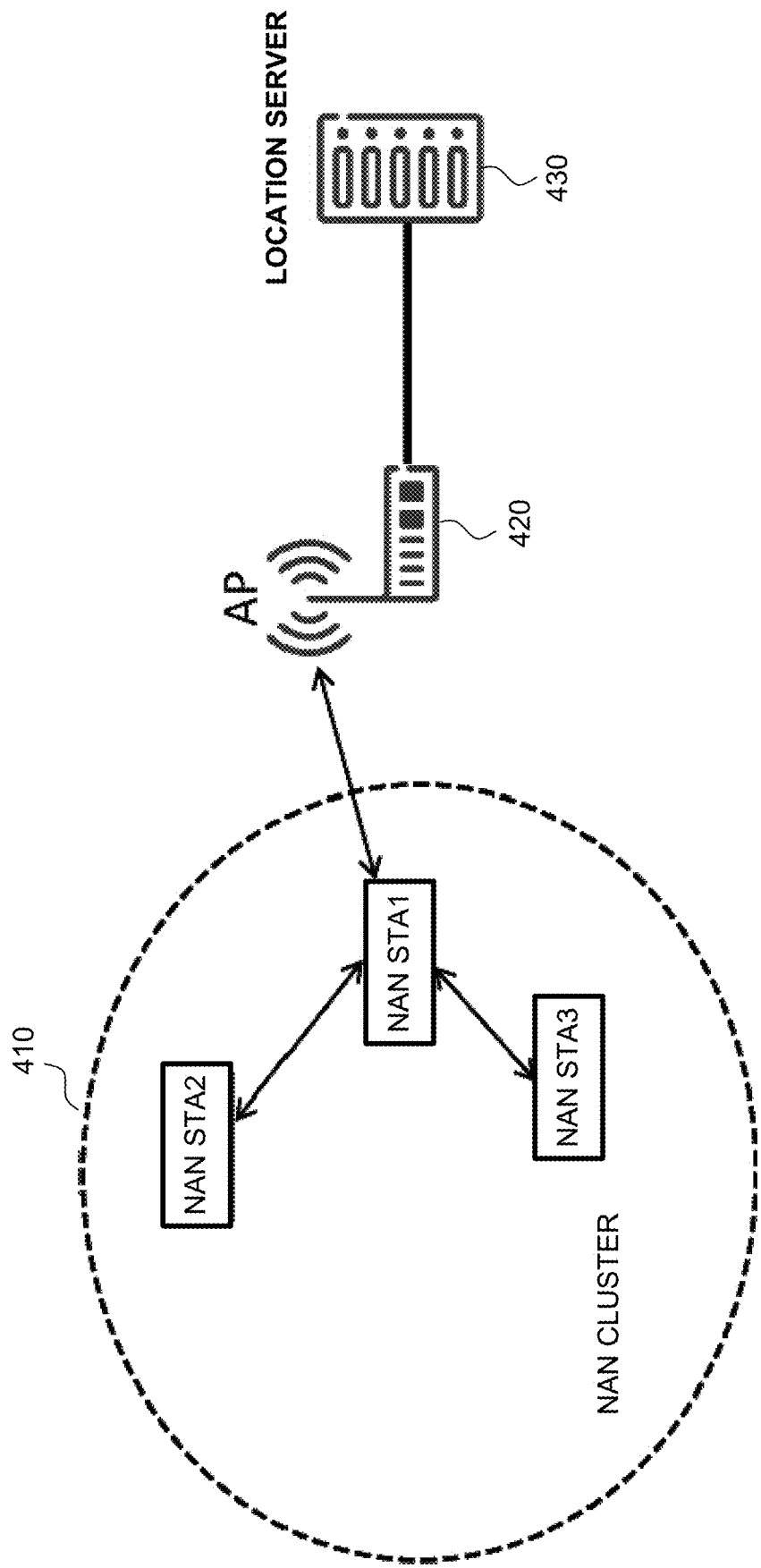
FIG. 4A illustrates an example of a positioning architecture involving a cluster of NAN devices.
Figure 4B:
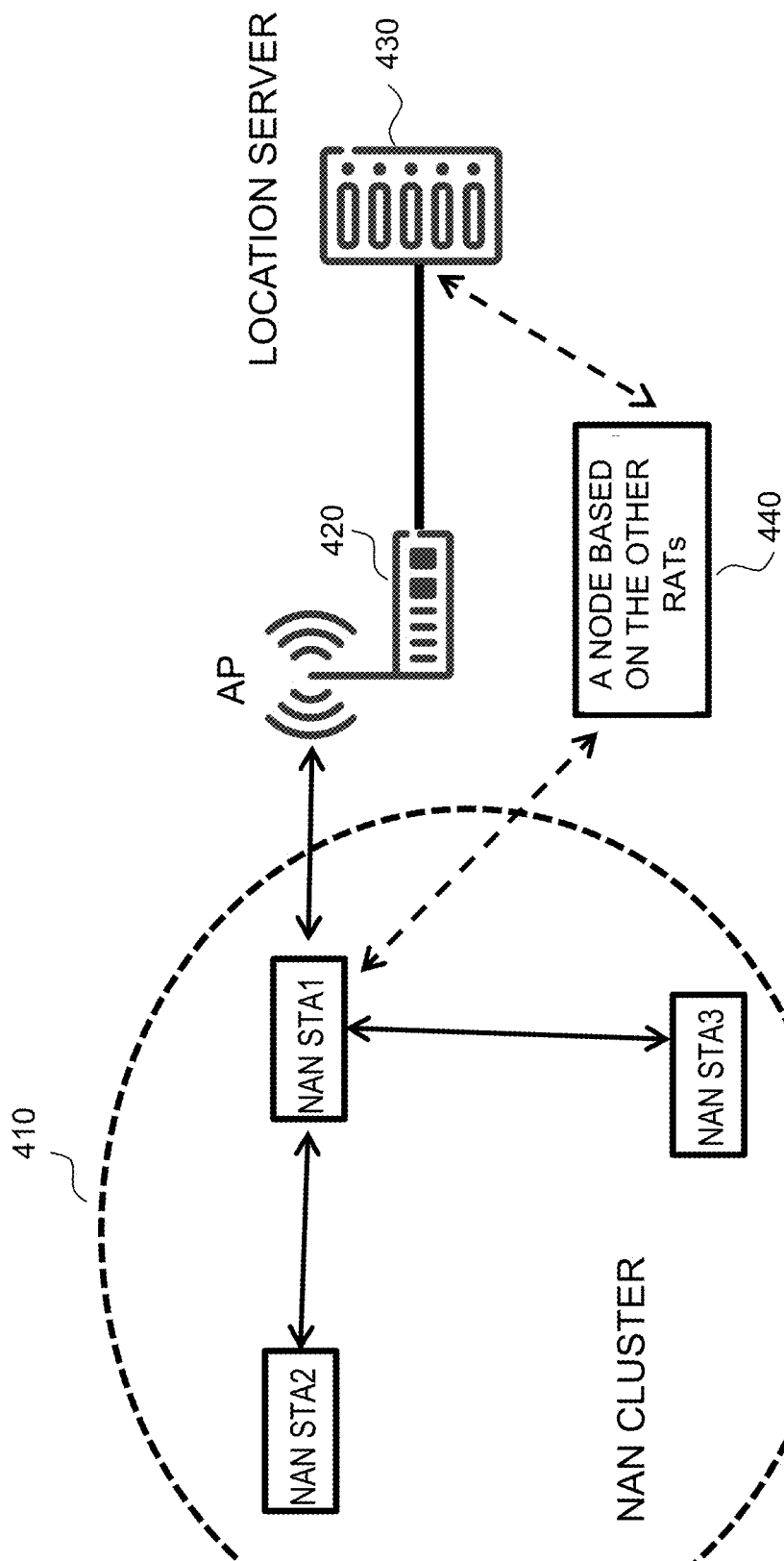
FIG. 4B illustrates another example of a positioning architecture involving a cluster of NAN devices.
Figure 4C:
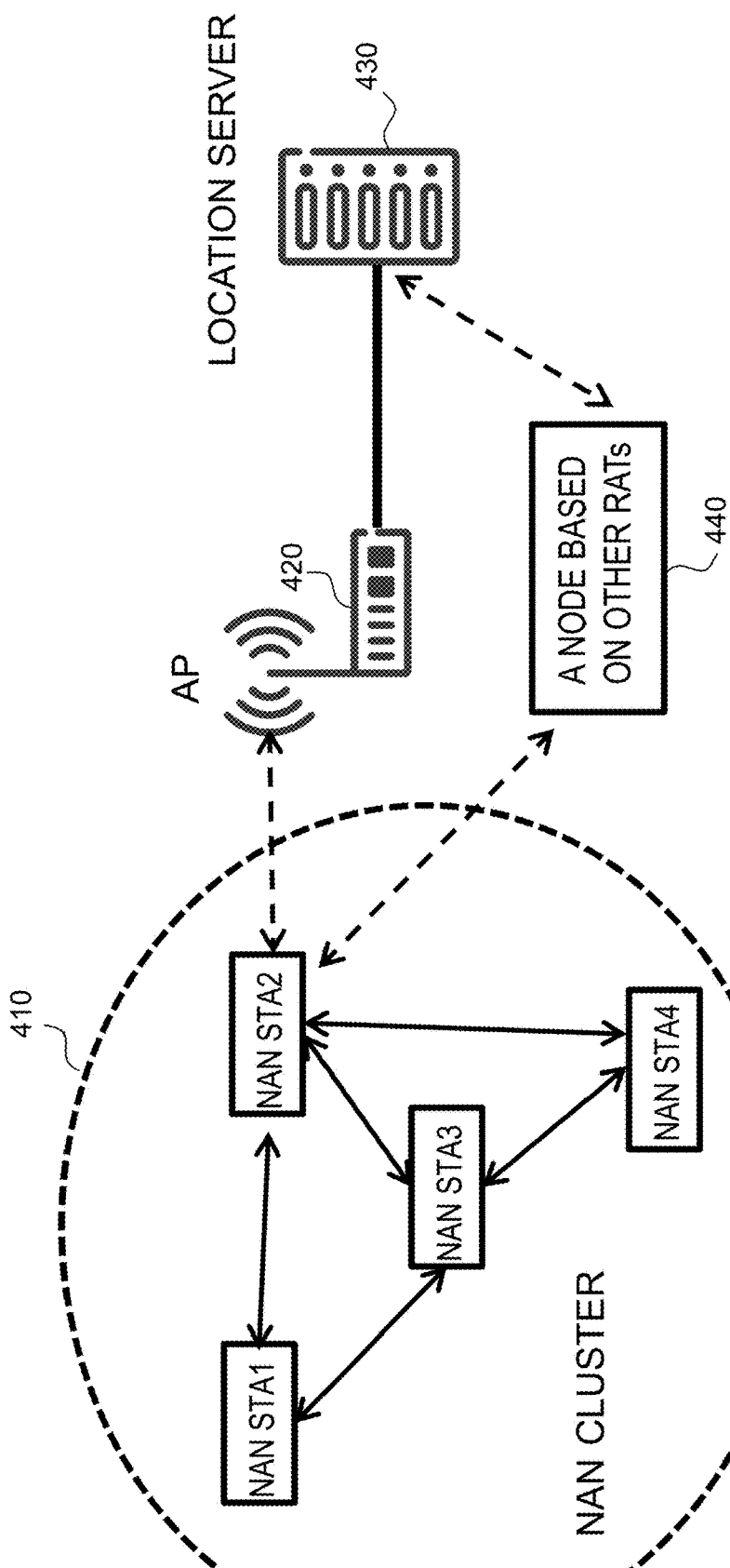
FIG. 4C illustrates another example of a positioning architecture involving a cluster of NAN devices.

In the examples of FIGS. 4A, 4B and 4C below, the target NAN device is NAN STA1 in FIGS. 4A and 4B, and NAN STA3 in FIG. 4C, wherein the other NAN devices may act as anchor NAN devices. As will be evident below, a positioning node is a NAN device (or AP) which can be used for range measurements with the target NAN device, because its location is known. For example, the location is stored in the node itself as GPS coordinates or Cartesian coordinates or polar coordinates with respect to a reference frame, such as a frame with a known format of degrees of longitude and latitude as well as meters of altitude in the case of GPS. Storing this information may be done in a table in the node's storage having multiple entries for the current coordinates and preferably also for past coordinates.

From the above discussion, it is easily conceivable that the sequence of steps 310 and 320 may be reversed so that a cluster is determined first and then one device of the cluster may request its location or the location of another device of the cluster.

Further, in step 330 of FIG. 3, range measurements using the travel times of radio signals between the target NAN device and each of the one or more (preferably two or three) anchor NAN devices of the cluster are performed. Additionally, an access point having a predetermined location may be provided to serve as additional positioning node and so that range measurements using the travel times of radio signals between the target NAN device and the access point can be performed. Several ranging techniques are feasible, preferably being based on travel times of radio signals, such as Wi-Fi signals transmitted and/or received from the NAN devices or an AP which are based on IEEE 802.11 communication, and particularly on IEEE 802.11n (or higher versions) operating with carrier frequencies at 2.4 GHz and 5 GHz.

Figure 6:
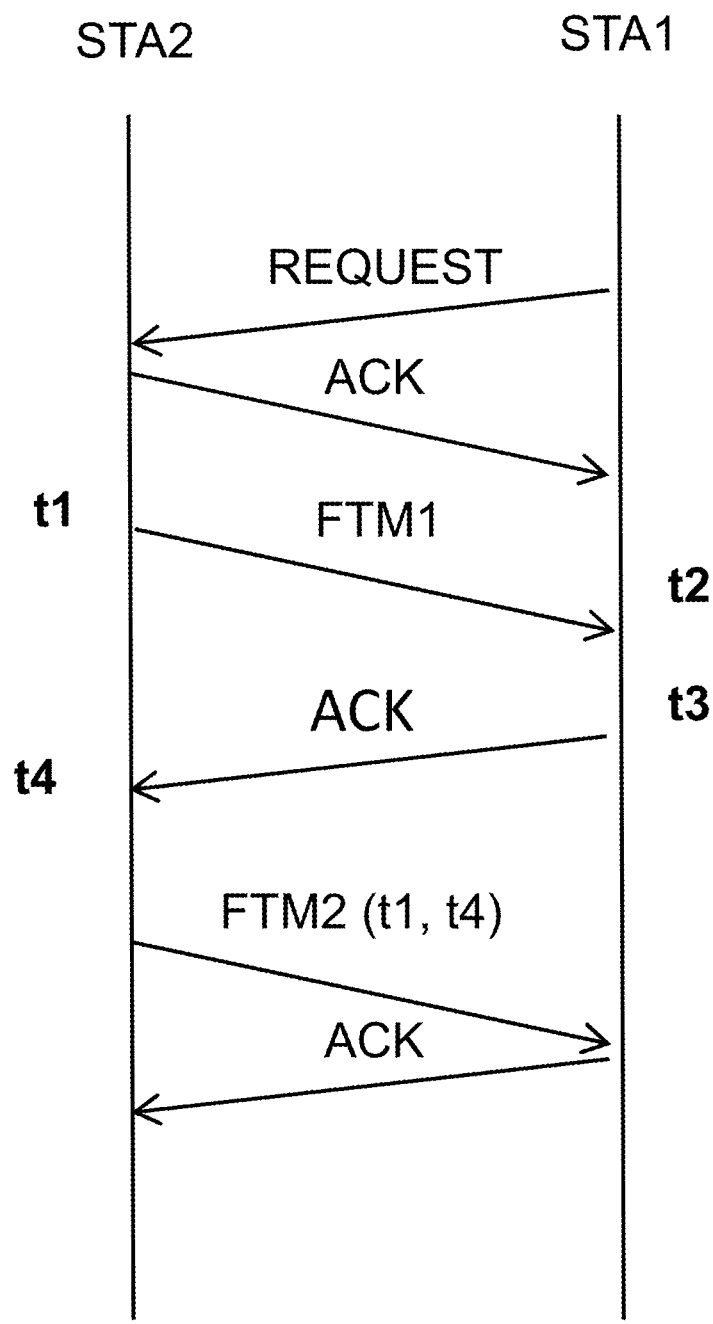
FIG. 6 illustrates an exemplary fine timing measurement (FTM) procedure.

In one embodiment, the range measurements may be fine timing measurements (FTM). FTM, as mentioned for example in IEEE P802.11-REVmc/D3.2 of September 2014 "Draft Standard for Information technology", is particularly useful in the present embodiments. The range measurements in FTM basically use the travel time of a radio signal between two devices to derive the distance, e.g. in meters, between the two devices. An exemplary FTM procedure is illustrated in FIG. 6. Instead of range measurements based on travel time, signal strength measurements are known which however are less accurate.

The illustrated FTM technique is a three-stage procedure including negotiation, FTM implementation, and reporting the time-stamp of the previous FTM exchange. First, a handshake between two devices is executed, here between two nodes STA1 and STA2, which may be a NAN device and an AP, and preferably two NAN devices. One of the nodes has usually a known location and the other one an unknown location. If the node with the known location is a NAN device, we call this node herein an anchor NAN device constituting a positioning node of the system. If the node with the known location is an AP, it also constitutes a positioning node of the system.

Then, after negotiation including a request for a packet and an acknowledgment (ACK) response, a FTM packet is sent at time t1 by STA2 and is received at time t2 by STA1. The times t1 and t2, which are the time of departure (ToD) and the time of arrival (ToA) of this FTM packet, respectively, are recorded at the nodes. Subsequently, an associated ACK packet is sent from STA1 and received by STA2 and the corresponding ToD t3 and ToA t4 can then be recorded. A follow-up packet may be utilized to carry data such as an indicator of t1 and t4 to STA1 so that the node STA1 can record all times t1 to t4. The times may also be forwarded to a location center for evaluating the times and obtaining a range. The round-trip time can be calculated by the node as $((t4-t3)+(t2-t1))/2$. The clock offset between two devices can be compensated automatically. A value for the offset can be calculated by $((t4-t3)-(t2-t1))/2$.

Since the range, i.e. distance, obtained by the FTM procedure merely describes a sphere (a sphere in three dimensions; in practice a good estimate by a circle in two dimensions is already very useful), the node with the unknown location is located somewhere on this sphere around the node with the known location. Therefore, further measurements are desired to define the location on the sphere more exactly.

Figure 7:
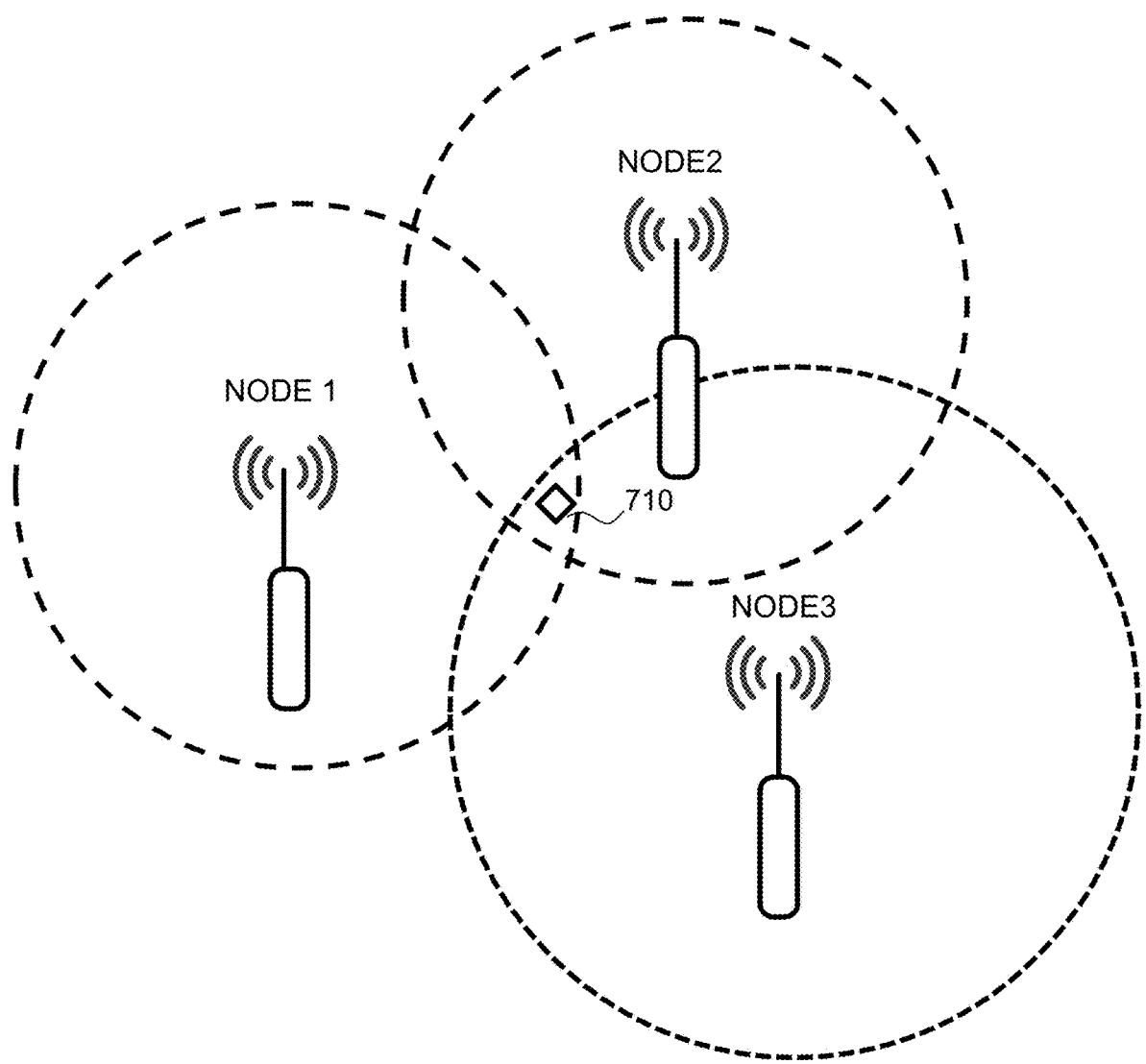
FIG. 7 illustrates a concept of positioning by triangulation useful for obtaining a device location.

This may be done using the concept of triangulation. Note that here NAN devices and not only APs are involved in the triangulation. To obtain good results with triangulation, three or more positioning nodes are desired as illustrated in FIG. 7, in which node1, node2 and node3 can locate the target 710. For example, three anchor NAN devices can locate the target NAN device. Alternatively, two anchor NAN device and one AP or one NAN device and two APs can locate a target NAN device. In more detail, each node forms with the target NAN device a pair of nodes and range measurements for each pair of a target NAN device and a positioning node should be carried out, preferably using the above described FTM procedure.

However, the scheme presented herein is not limited to triangulation and not to the use of at least three positioning nodes. Other techniques, such as Angle of Arrival (AoA) may also be used. In particular, if one or more nodes involved in the FTM procedure have two or more antennas, an angle of arrival of a radio signal of another node can be obtained so that using simple geometry, an accurate location in two or three dimensions may be achieved using several angle of arrival measurements and/or range measurements. Since more than one simple distance from a range measurement is obtained from one pair of nodes, one or two positioning nodes may be enough. For example, if node1 of FIG. 7 obtains an angle of arrival from a time of arrival measurement and a distance, only one more node, e.g. node2 or node3 should contribute another range measurement.

In step 340, the location of the target NAN device is obtained based on range measurements. For example, the location of the target NAN device is obtained by the above-mentioned triangulation using at least three range measurements between the target NAN device and three positioning nodes. Alternatively or additionally to using range measurements from three positioning nodes, the location can also be obtained based on range measurements from two positioning nodes and one angle of arrival measurement. Several combinations of measurements are feasible.

For example, if a positioning node moves and the movement and thus the node's locations in time are known, it is even possible to carry out three or more range measurements at three or more different times between a fixed target NAN device and the positioning node to obtain reliable location information. For example, the location of the target NAN device may be represented by coordinates defining a point in three-dimensional space. Coordinates may be GPS coordinates or Cartesian coordinates or polar coordinates with respect to a reference frame, such as a frame with a known format of degrees of longitude and latitude as well as meters of altitude in the case of GPS. As noted above, storing this information may be done in a table in the node's storage having multiple entries for the current coordinates and preferably also for past coordinates.

The more range measurements and/or angle of arrival measurements obtained, the higher the accuracy of the location derived from these measurements. This measurement information may be received at one node which then computes/calculates the location. This node is referred to in the following as a location center. According to one embodiment, the additional step of receiving messages including range measurement information of the range measurements from NAN devices of the cluster at a location center is performed, wherein the location center obtains the location, e.g. location coordinates in 2D or 3D space, of the target NAN device using the range measurement information. In particular, the location center is either one of the NAN devices of the cluster or an access point of a wireless network serving as an additional positing node. In one example, the location center calculates the location according to the above discussed triangulation based on FTM or/and the discussed FTM and angle of arrival measurements.

Accordingly, a new ranging functionality is provided to NAN devices, which allows determining the distance between two devices fairly accurately. Moreover, the above-discussed scheme is not limited to merely "discovering" devices in the neighborhood but allows obtaining the exact location of devices using the FTM protocol for high-accuracy distance measurements by NAN devices as well as triangulation without the need of an AP, for example. In particular, in non-dense deployments, APs that are usually suitable for positioning purpose are not always available. In such scenarios, positioning functionality can usually not be guaranteed because of the lack of location centers, i.e. APs. However, by selecting NAN devices with the above functions as positioning nodes and as a location center, as the case may be, obtaining the location becomes independent of one or more APs.

The selection of the location center is also important, since a typical Wi-Fi network involves a mixture of nodes, e.g. a cluster of NAN devices that may operate according to different NAN releases as well as possibly one or more APs. Those nodes may vary significantly in terms of computational capability for positioning purposes. Therefore, there is also a need for methods enabling the selection of a suitable node as location center, in particular for the scenarios with a lack of AP nodes.

For example, a method for selecting the location center comprises a selection step and a receiving step. The selection step of selecting one of the positioning nodes, e.g. comprising NAN devices of the cluster and one or more associated APs, as the location center may be based on at least one of the following criteria.

Firstly, the location center may be selected based on the strength of a Reference Signal Receive Power, RSRP, with respect to the target NAN device. For example, the positioning node is selected as location center which receives the strongest RSRP from the target NAN device. Secondly, the location center may be selected based on the battery level of the positioning node. For example, the positioning node is selected which has the highest battery level or which has a battery level higher than a threshold. Thirdly, the location center may be selected based on the amount of data transmission by a positioning node predicted in an upcoming period of time. For example, the positioning node is selected which has the least data transmission predicted in an upcoming period of time. Fourthly, the positioning node may be selected as the location center, if the positioning node is a NAN device which operates in the cluster and communicates with an access point directly. Fifthly, the positioning node may be selected as the location center, if the positioning node is a master NAN device. Further, an access point may be selected as the location center when two NAN devices and an access point (AP) are the only positioning nodes of the cluster.

More than one of the above criteria may be used at the same time to select the location center. In particular, two or more criteria may be combined and weighted (prioritized) differently. The selection may be performed by a NAN device, e.g. acting as positioning node or calculation center, which comprises modules or elements configured to carry out the above functions.

The above method for selecting the location center may further comprise a receiving step, in which range measurements from the travel times of radio signals between the target NAN device and each of one or more NAN devices of a cluster are received. Accordingly, a suitable location center can be selected which obtains measurement information which can be used to calculate a location of the target NAN device.

As noted above, the method for selecting the location center may be performed by a node collecting information, such as the strength of a Reference Signal Receive Power, RSRP, with respect to the target NAN device; the battery level of the positioning node; the amount of data transmission predicted in an upcoming period of time, etc.

Figure 9:
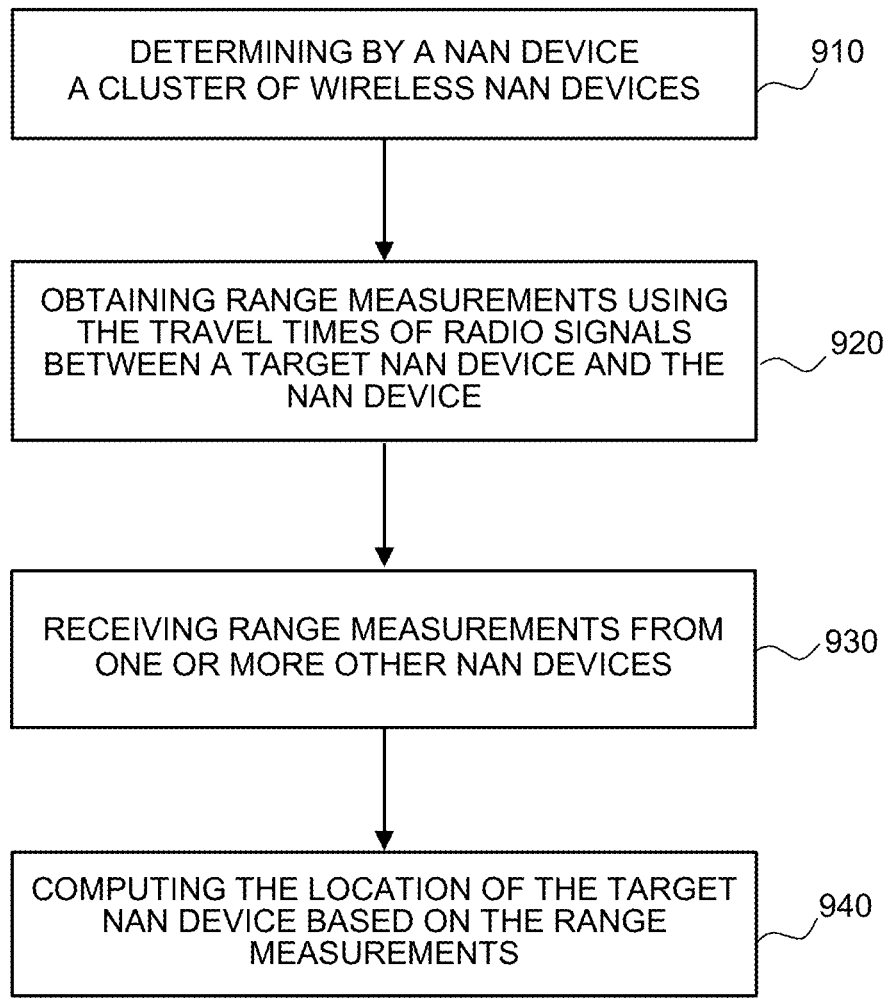
FIG. 9 illustrates operations of a method carried out by a NAN device for obtaining a location of a NAN device according to an embodiment.

In another embodiment shown in FIG. 9, a method carried out by a NAN device is described for obtaining a location using NAN. The method comprises or initiates steps similar to the above method of the system so that it is referred to the above explanations for details. However, the steps of the method of the system are preferably distributed over several system nodes, whereas the steps of the method in FIG. 9 are performed or at least initiated by a NAN device, preferably an anchor NAN device also acting as a location center.

In a first step 910, the NAN device determines a cluster of wireless NAN devices comprising a target NAN device and at least the NAN device. The NAN device has a predetermined location so as to serve as positioning node. Details of the devices and nodes are mentioned above.

In step 920, range measurements are obtained using the travel times of radio signals between the target NAN device and the NAN device. Range measurements may include FTM as mentioned above.

Additionally, other range measurements which may comprise any kind of range measurement information from the travel times of radio signals between the target NAN device and each of one or more other NAN devices is received in step 930.

Once the different range measurements are obtained/received, the location, i.e. the coordinates of the location, of the target NAN device can be computed based on these range measurements.

Obtaining an accurate location of the target NAN device, leads to several advantageous use cases. For example, with the knowledge of the location of the target NAN device, it is possible to determine whether a customer using this device is outside/inside a café, or whether a friend is close by (friend finder). Further, concurrent video streaming in a stadium, etc. is possible. The ranging functionality does not only enable a NAN device to estimate a distance from other NAN devices that support ranging capability but it helps to find an exact location.

Ranging functionality can be used in addition to a Service Discovery mechanism to estimate the distance to a NAN device providing a specific service. The ranging functionality can be invoked as a part of publish and subscribe discovery functions or as a separate NAN ranging function. Ranging measurements are carried out using the above-described fine timing measurement (FTM) procedure but also other time of flight procedures are possible. With this ranging functionality also more accurate geo-fencing is possible, which enables a NAN device to trigger an event when a certain range condition is met. For an ingress geo-fence, an event is sent by the Ranging Engine to an application registered for the service when the device moves into the range of the inner threshold. For an egress geo-fence, an event is sent by the Ranging Engine to an application registered for the service when the device moves out of the range of the outer threshold.

Examples of positioning architectures are shown in FIGS. 4A, 4B and 4C. All figures show a NAN network comprising a number of NAN devices in NAN cluster 410. One device, for instance NAN STA2 in FIG. 4C, may operate concurrently in the NAN and in a basic service set, BSS, i.e. being able to communicate with the AP 420. Such a device is considered a Concurrent NAN Device. The AP 420 may be able to report collected measurement data to a location server 430. The location server 430 calculates the location estimate of the target STA (target NAN device) based on the reported measurement and other available information in a database of the location center. Alternatively, the location calculation is carried out at the AP 420 and the location estimate is reported to the location server 430. Preferably, the location calculation is carried out at a selected NAN device of the NAN cluster serving as positioning node and location center. This gives a high flexibility, since an AP or location server is not needed to obtain a location of the target.

In contrast to FIGS. 4A and 4B, there is no need for the AP 420 as positioning node in FIG. 4C and FTM-based positioning and triangulation can be carried out without AP 420 (no external node involved). If triangulation is considered to find the location of the target NAN device in the NAN cluster, the three STA devices 1, 2 and 4 may be enough to obtain the location by triangulation without involving the AP. This is especially true if the three STA devices 1, 2 and 4 have known locations and are selected as anchor NAN devices. As mentioned above, the location of anchor STAs may be acquired in different ways: for example, the NAN STAs requesting positioning service may be converted to an anchor immediately when a location estimation is available; pre-determined location during pre-installation is available for static devices; location information is acquired through other technologies such as finger-printing, etc. The anchor NAN device's location information, e.g. coordinates, is stored and updated when possible at the location server or other location center.

If, for example, the NAN STA2 is selected as the location center in FIG. 4C, it may receive messages including range measurement information of the range measurements from NAN STA1 and NAN STA4 of the cluster so as to obtain the location of the target NAN STA3. In the examples of FIGS. 4A and 4B, the target NAN device is NAN STA1 and the AP 420 or/and another node 440 serve as positioning nodes. For example, FIGS. 4A and 4B are relevant, if the number of NAN STAs with positioning functionality is not sufficient, and one or more AP nodes may be involved. In FIGS. 4A and 4B, only NAN STA2 and NAN STA3 are available, so that the target device, NAN STA1, involves the AP as one of the positioning node.

In the following, the positioning procedure will be discussed in more detail with respect to FIGS. 4A, 4B and 4C.

As noted above, in the example of FIG. 4C, FTM-positioning may be carried out within the NAN cluster without involving the AP 420. Upon receiving the location indication/request from the AP 420 or the location center, the Concurrent NAN device (NAN STA2 in FIG. 4C) initiates FTM ranging towards the target STA (NAN STA3 in FIG. 4C). NAN STA2, as a positioning node in the NAN cluster, is continuously being monitored for location. Through the FTM protocol, the distance estimate between NAN STA2 and NAN STA3 is produced. Meanwhile, NAN STA2 as the Concurrent NAN Device invokes other anchor STAs (NAN STA1, NAN STA4) to initiate ranging to the target STA. The invoking function can be a part of Publish and Subscription discovery functions or as a separate function for solely invoking purpose.

Distance measurement results are reported to NAN STA2 from all anchor STAs, in this example NAN STA1 and NAN STA4. Based on ranging data, triangulation positioning is performed at NAN STA2 and the location estimate, for example the coordinates of NAN STA3, is reported to the AP or the location server. Alternatively, all ranging data including those collected at the Concurrent NAN device are reported to and further processed at the AP 420 or the location server 430 for a location estimate. The location information of the anchor STAs can be conveyed through signaling or extracted from the database at the location server.

Another communication node 440 that is based on other radio access technologies (RATs), such as Bluetooth, or GPS (e.g. a node that has its own positioning by being connected to GPS, Global Positioning System, directly or indirectly via another node), functions in a similar manner as the AP node. Thus, instead of involving the AP node, if at all necessary in FIG. 4C, the node 440 may be involved alternatively. That is, the Concurrent NAN device is communicatively coupled to an access point or other communication node that uses a wireless communication technology. FIGS. 4A and 4B merely differ functionally in the presence of communication node 440 in FIG. 4B.

If the target STA is a Concurrent NAN device, the AP is also a part of the ranging operation. As illustrated in FIG. 4B, either NAN STA1 or the AP may first initiate ranging with each other through FTM. Subsequently, NAN STA1 itself invokes NAN ranging with at least two anchor STAs (NAN STA2 and NAN STA3 in FIG. 4B) in the same cluster.

If NAN STA1 is capable of location calculation, such operation can be performed at NAN STA1 based on acquired ranging data. The location estimate is then reported to the AP 420 or the location center 430. Alternatively, if NAN STA1 is not capable for location calculation or it is too power-consuming, this step can be accomplished at the AP 420 or the location server 430 or communication node 440. Corresponding ranging data is transferred from STAs through signalling or as data transmission. It is noted that, the above procedure can be repeated periodically as a method to update the location of anchor or Concurrent NAN devices.

The communication node 440, different to an Wi-Fi AP, can also be a part of the ranging operation, which relies on a different ranging method. For example, such a node can be a Bluetooth or Bluetooth low energy (BLE) node and the ranging measurement is based on Received Signal Strength Indication (RSSI).

As understood from the above, it is possible to position NAN devices without involving an AP or optionally, involving one AP or one node based on other radio access technologies (RATs). From a network perspective, flexibly distributing the location center is an efficient way to relieve the AP node's computational burden and to reduce the processing delay as higher layer processing entities are not directly involved in the positioning computation.

In the following, an exemplary protocol design and the associated signaling support for Wi-Fi NAN devices to determine the exact location of devices will be discussed. Further, more details about the method of selecting the location center from available positioning nodes (NAN STAs or AP) will be given.

In principle, the location center can be any AP node or any capable NAN STA. Lowering the location center in the network hierarchy has a number of advantages, for example, distributing the computational burden from the location server as center and reduced delay. The procedure of location center selection may be triggered by the STA that requires positioning service.

Figure 5:
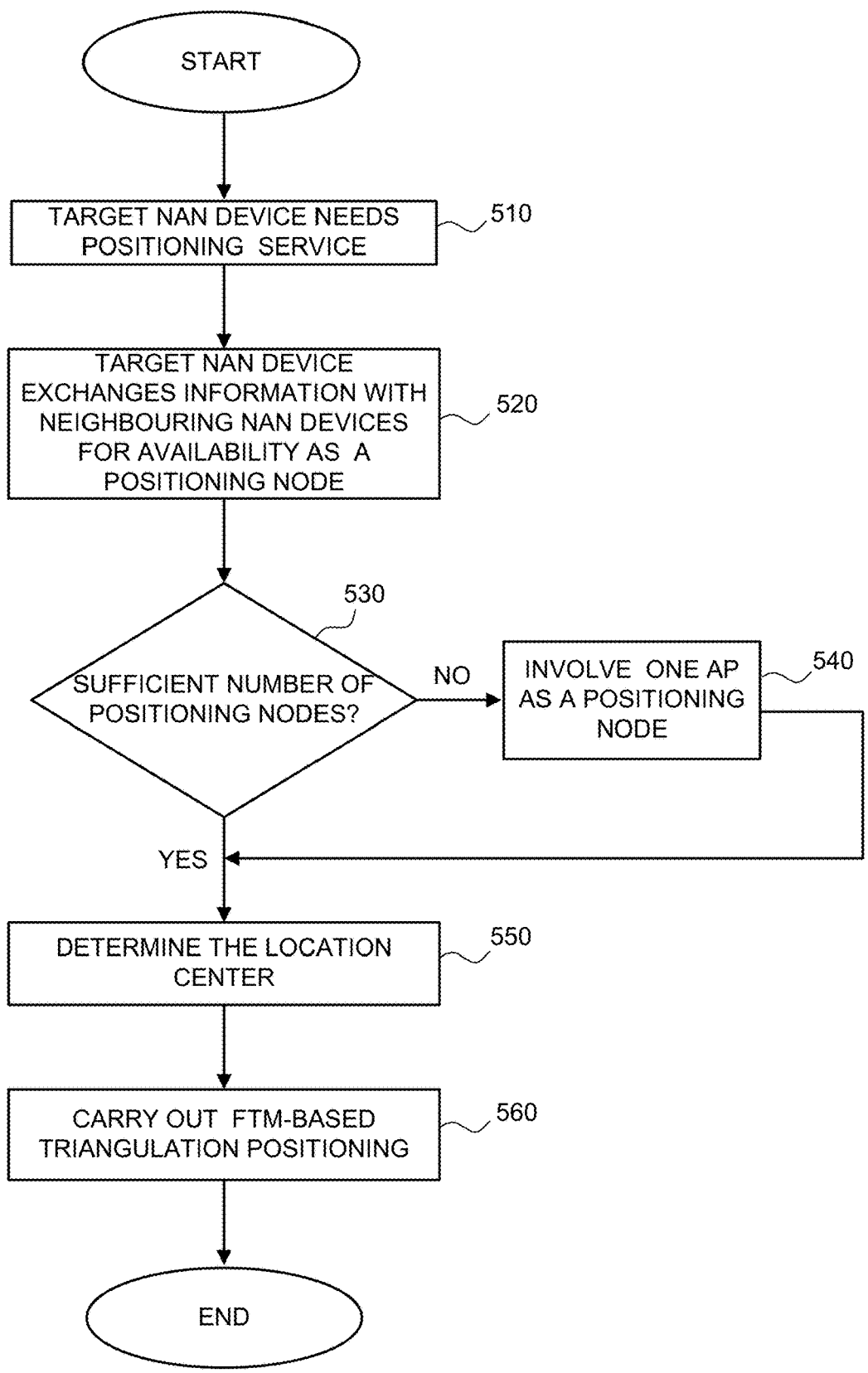
FIG. 5 illustrates operations of a method to select positioning nodes for a positioning service and a location center according to an embodiment.

FIG. 5 illustrates the selection of the positioning nodes for positioning service and selection of the location center procedure.

The location center can be selected dynamically according to the availability of AP nodes and/or capable NAN STAs. For the target STA, the location center search is initiated by communicating with neighboring STAs/nodes for availability as a positioning node. The procedure of location center search and selection is illustrated in detail in FIG. 5. The target STA examines thus the availability and positioning capability of neighboring STAs and AP nodes.

In detail, in step 510, target NAN device requires a positioning service so that it exchanges information with neighboring NAN devices for availability as a positioning node in step 520. Then, it is checked whether there is a sufficient number of positioning nodes in step 530. If this is not the case, one AP is involved as a positioning node in step 540. If the number is sufficient, the flow moves directly from step 530 to step 550 without going first to step 540, in which the location center is selected. Several possibilities for selection are discussed above and below. Once the location center is selected, FTM-based triangulation positioning is performed in step 560.

The location center selection can be carried out by the target STA, other positioning STAs, one of the AP nodes or by a higher-layer controlling center in the network. The selection of the location center can be based on specific criteria and/or scenarios.

In one embodiment, one of the set of the positioning nodes is selected as the location center, which has the strongest RSRP to the target node.

In another embodiment, one of the set of the positioning nodes is selected as the location center, which has the highest battery level or a battery level higher than the threshold.

In another embodiment, one of the set of the positioning nodes is selected as the location center, which is also the concurrent NAN device, i.e. a NAN device which can operate concurrently in the NAN and also communicate with an AP directly.

In another embodiment, one of the set of positioning nodes is selected as the location center, which has least data transmission predicted in the upcoming period of time. On the other hand, if all neighboring STAs are transmitting/receiving data, the closest AP if available can be prioritized.

In another embodiment, where three NAN devices are involved in FTM based positioning, and one of the NAN device is also a master device, then the master device is selected as the location center.

In another embodiment, when two NAN devices and an AP are involved in the FTM based positioning (as depicted in FIGS. 4A and 4B), then preferably the AP is selected as the location center.

Specifically, the following signaling support for location center selection can be given in a Wi-Fi network.

After determining the network topology for the positioning service for a specific NAN STA, i.e. after the involved positioning nodes are determined, FTM-based triangulation positioning may be carried out. This requires necessary signaling between NAN devices as indicated in FIGS. 4A to 4C. Hence, in the following, the signaling part is discussed through which information and measurements can be exchanged between NAN devices.

The NAN location function can be invoked as a part of Publish and Subscribe discovery functions or as a separate NAN location function. Existing NAN messages of publish and subscribe, may include the location of the NAN device, e.g. as a part of configuration parameters of Publish/Subscribe message. Also, it may include a "location flag", to indicate whether the location parameters are either mandatory or optional for offering/getting the service.

Also location information can be part of a Discovery Result message sent by the NAN device, when the location criteria is matched based on the location parameters in the publish message, e.g. loyal customer, who is inside a cafe, its presence may be notified to the cafe owner by sending the NAN Discovery Result. Similarly, location information can also be part of other NAN messages.

As noted above, a location request can be initiated by a NAN device to get the location information of itself or other neighboring NAN devices. The NAN device needing its own location information may initiate location measurements getting the help from other NAN devices supporting location functionality within a NAN cluster. A location request method may be used by one NAN device to get the location of other NAN devices, which may include the MAC address, location accuracy and periodicity of updating the location of the other NAN device. Also, a NAN device may ask other NAN devices to stop sending the location information. Location request of a specific NAN device may be initiated by one of the NAN devices belonging to the same cluster or by a specific NAN service requiring the location information to offer the service. Privacy issues of sharing the location information of a particular NAN device may be considered before sharing the location information with the other NAN devices.

Methods to support the location functionality may include:
  NAN device or server requesting the location of other NAN device or itself
  NAN device/Server responding with the location of itself or other NAN device
  Mechanism to select the NAN devices or AP as anchor
  Mechanism that the anchor NAN device requests another anchor NAN device to initiate the location functionality with the target NAN device.
  NAN device reporting the distance measurement to AP or server or anchor STA.

Figure 8:
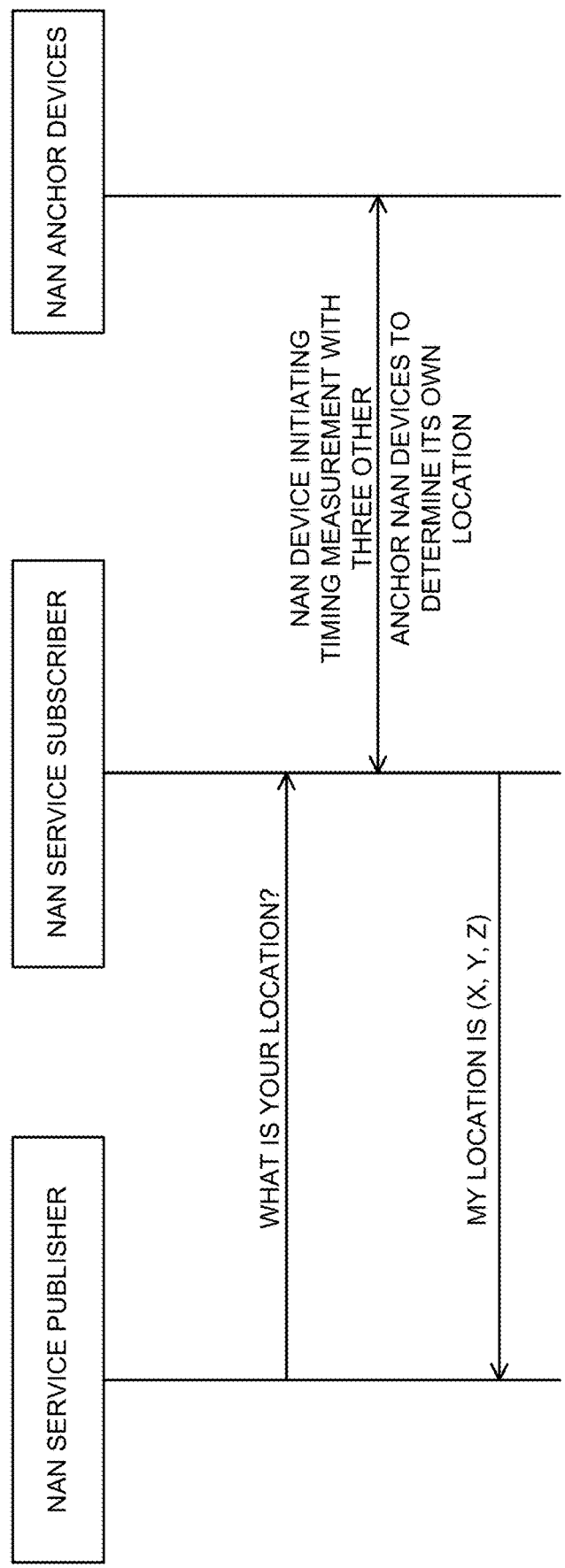
FIG. 8 illustrates an example of a flow chart of a message exchange between NAN devices.

FIG. 8 illustrates an example of a flow chart of a message exchange between NAN devices, one of which is requesting the location of another NAN device. The other NAN device is getting the help of three other anchor NAN devices using fine timing measurement to determine its own location. Finally the location is communicated to the node asking for the location information. In this example, the location is provided in Cartesian coordinates x, y, z.

Figure 10:
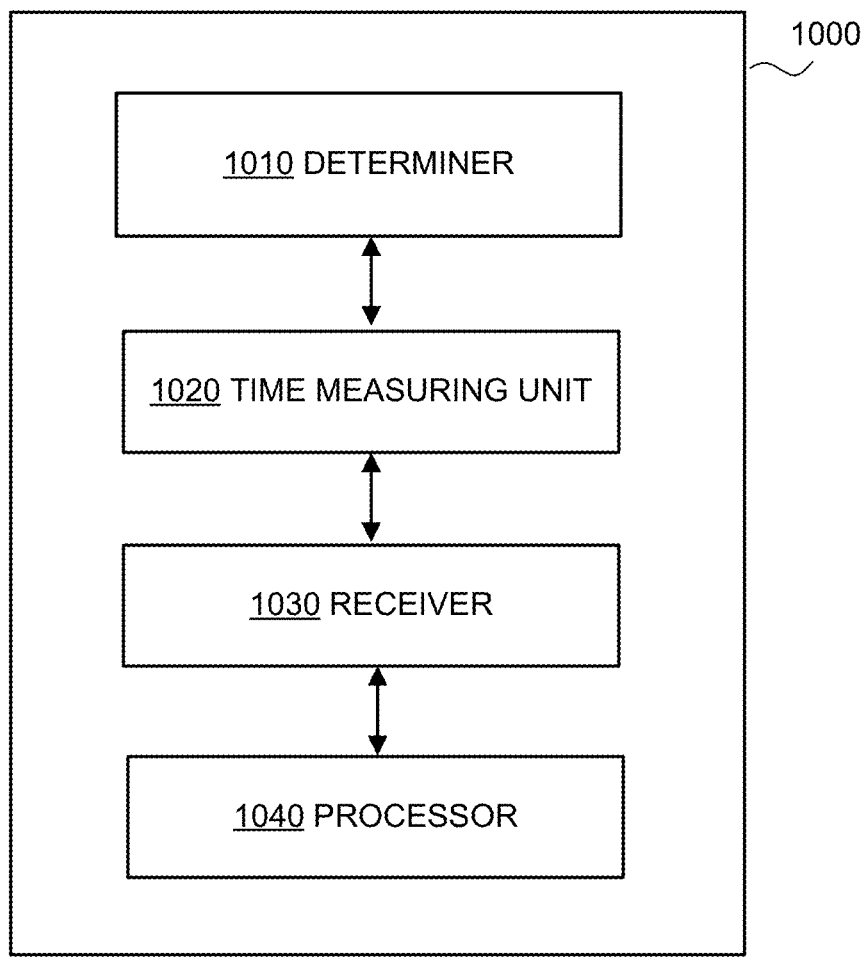
FIG. 10 illustrates a NAN device according to an embodiment.

It is referred now to FIG. 10, which illustrate elements of a NAN device 1000. Elements, which may also be referred to as modules in the following, are adapted to carry out multiple functions, in particular, the steps/functions of the described method of the NAN device, e.g. presented in FIG. 9.

The NAN device 1000 may comprise a (micro) processor to carry out at least some of the above described functions, specifically the functions described with respect to FIG. 9.

As can be seen in FIG. 10, the NAN device comprises the following elements/modules: a determiner 1010, a time measuring unit 1020, a receiver 1030 and a processor 1040. Specifically, the determiner and the time measuring unit may be tangible elements, such as a timer circuit in case of the time measuring unit, or software functions running on a processor.

The NAN device has a predetermined location to serve as a positioning node in a cluster of NAN devices, wherein the determiner 1010 is configured to determine a cluster of wireless NAN devices comprising a target NAN device and at least the NAN device.

The time measuring unit 1020 is configured to obtain range measurements using the travel times of radio signals between the target NAN device and the NAN device. Travel times may be obtain by a timer circuit, wherein the start and arrival time of a radio signal are recorded in a memory of the NAN device.

The receiver 1030 is configured to receive range measurements from the travel times of radio signals between the target NAN device and each of one or more other NAN devices. The receiver may comprise an antenna and receiver circuit for receiving and processing the received information.

Finally, the processor 1040 of the NAN device or one of its co-processors, if available, is configured to compute the location of the target NAN device based on the range measurements.

Similarly but not shown in the figures, elements of the system, which may also be referred to as modules or elements in the following, are adapted to carry out multiple functions, in particular, the steps/functions of the described method of the system, e.g. presented in FIG. 3.

The system for obtaining a location using neighbor awareness networking (NAN) comprises a requestor configured to request the location of a target NAN device; a determiner configured to determine a cluster of wireless NAN devices comprising the target NAN device as well as one or more anchor NAN devices having predetermined locations to serve as positioning nodes; a time measuring unit configured to obtain range measurements using the travel times of radio signals between the target NAN device and each of the one or more anchor NAN devices; and a processor configured to compute the location of the target NAN device based on the range measurements.

For example, the determiner, the time measuring unit and the processor may be the same ones as in FIG. 10 of the NAN device, wherein the requester may also be implemented as software on a processor, preferably a processor of a different device, such as a target NAN device.

Accordingly, the same advantages which are achieved with the above described methods can also be achieved by the NAN device 1000 and the mentioned system.

As is understood by the skilled person, a NAN device may include a bus, a processing unit, a main memory, a ROM, a storage device, an I/O interface consisting of an input device and an output device, and a communication interface, such as a transceiver. The bus may include a path that permits communication among the components/elements. Processing unit may include a processor, a microprocessor, or processing logic that may interpret and execute instructions. Main memory may include a RAM or another type of dynamic storage device that may store information and software instructions for execution by processing unit.

The NAN device and system may perform certain operations or processes described herein, and may perform these operations in response to processing unit executing software instructions contained in a computer-readable medium. A computer-readable medium may be defined as a physical or a logical memory device. For example, a logical memory device may include memory space within a single physical memory device or distributed across multiple physical memory devices.

The software instructions contained in a main memory may cause the processing unit including a processor, when executed on the processor, to cause the processor to perform operations or processes described herein. Alternatively, hardwired circuitry may be used in place of or in combination with software instructions to implement processes and/or operations described herein. Thus, implementations described herein are not limited to any specific combination of hardware and software.

The physical entities according to the different embodiments of the invention, including the units, elements, nodes, devices and systems, may comprise or store computer programs including software instructions such that, when the computer programs are executed on the physical entities, steps and operations according to the embodiments of the invention are carried out, i.e. cause processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the terms determiner, requester and time measuring unit are used, no restriction is made regarding how distributed these elements may be and regarding how gathered these elements may be. That is, the constituent elements may be distributed in different software and hardware components or other elements for bringing about the intended function. A plurality of distinct elements may also be gathered for providing the intended functionalities.

Further, the elements of the NAN device or system may be implemented in hardware, software, Field Programmable Gate Arrays (FPGAs), Application Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

What is claimed is:

1. A method for obtaining a location in a WIFI network, wherein the method comprises:
    requesting the location of a target device in said network;
    performing range measurements using the travel times of radio signals between the target device and each of one or more devices having respective known locations in said network; and
    receiving messages including range measurement information of the range measurements at a location center device, wherein said location center obtains the location of the target device using the range measurement information;
wherein the location center is one of the one or more devices in said network.

2. The method of claim 1, wherein said location center is an access point of a wireless network that serves as an additional positioning node, and the range measurements are performed for only two devices having known locations and the access point.

3. The method of claim 1, wherein one of the one or more devices is selected as said location center based on at least one of the following criteria:
    the strength of a Reference Signal Receive Power (RSRP) with respect to the target device;
    the battery level of the selected device;
    an amount of data transmission predicted in an upcoming period of time; or
    the selected device operates in a cluster and communicates with an access point directly.

4. The method of claim 1, further comprising:
    providing an access point having a predetermined location to serve as an additional positioning node and performing range measurements using the travel times of radio signals between the target device and the access point.

5. The method of claim 1, wherein the target device exchanges information with neighboring devices for availability as a positioning node.

6. The method of claim 1, wherein at least one of the devices is communicatively coupled to an access point or other communication node that uses a wireless communication technology.

7. The method of claim 1, wherein the range measurements performed are fine timing measurements.

8. The method of claim 1, wherein the location of the target device is obtained by triangulation using at least three range measurements between the target device and three devices having known locations.

9. The method of claim 1, wherein the location of the target device is requested by a device of said WIFI network or by a WIFI service requiring the location to offer a service to the target device.

10. A method for obtaining a location in a WIFI network, wherein the method is carried out by a device having a known location and comprises:
    obtaining a range measurement using travel time of radio signals between the device having the known location and a target device;
    receiving range measurements from the travel times of radio signals between the target device and each of one or more other devices in said WIFI network; and
    computing the location of the target device based on the range measurements.

11. A device, comprising:
    a receiver; and
    one or more processors and memory, the memory containing instructions executable by the one or more processors whereby the device is configured to:
        obtain range measurements using travel times of radio signals between the device and a target device;
        receive range measurements from the travel times of radio signals between the target device and each of one or more other devices in said WIFI network; and
        compute the location of the target device based on the range measurements and a known location for the device.

* * * * *

UNITED STATES PATENT AND TRADEMARK OFFICE
CERTIFICATE OF CORRECTION

| | |
|---|---|
| PATENT NO. | : 11,598,839 B2 |
| APPLICATION NO. | : 17/230663 |
| DATED | : March 7, 2023 |
| INVENTOR(S) | : Amin et al. |

It is certified that error appears in the above-identified patent and that said Letters Patent is hereby corrected as shown below:

In the Drawings

In Fig. 7, Sheet 9 of 12, delete "NODE 1" and insert -- NODE1 --, therefor.

In the Specification

In Column 4, Line 28, delete "DESCRIPTION" and insert -- DETAILED DESCRIPTION --, therefor.

In Column 7, Line 44, delete "determining" and insert -- for determining --, therefor.

In Column 11, Line 12, delete "an Wi-Fi AP," and insert -- a Wi-Fi AP, --, therefor.

In Column 13, Line 7, delete "itself" and insert -- itself. --, therefor.

In Column 13, Line 9, delete "device" and insert -- device. --, therefor.

In Column 13, Line 10, delete "anchor" and insert -- anchor. --, therefor.

In Column 13, Line 48, delete "obtain" and insert -- obtained --, therefor.

Signed and Sealed this
Fourth Day of July, 2023

Katherine Kelly Vidal
*Director of the United States Patent and Trademark Office*